3,012,985
PELLETIZED SULFUR
Murray Zakheim, Yonkers, and James R. Doonan, Mount Vernon, N.Y., assignors to Stauffer Chemical Company, a corporation of Delaware
No Drawing. Filed Mar. 27, 1958, Ser. No. 724,258
8 Claims. (Cl. 260—33.6)

This invention relates to the provision of a pelleted sulfur product, the pellets so produced being stable and exhibiting a high degree of resistance against attritional losses in the form of dust, fines and other pellet fragments as the product is handled.

Sulfur, as conventionally supplied in the form of a fine powder, is difficult to handle since it is not free flowing and tends to plug the lines through which it is passed in numerous manufacturing operations. It also forms a fine dust in the atmosphere which presents a health as well as an explosion hazard. For these and other reasons attempts have heretofore been made to supply finely divided sulfur in the form of small pellets of one type or another. Many of the products so formed have utilized a relatively large percent of binding medium, thereby adding materially to product costs, while at the same time seriously degrading the quality of the product. Even aside from such factors, the pelleted sulfur materials hitherto available have been relatively friable and non-plastic; as a result, they have not held up well under handling, particularly after being stored for any appreciable length of time.

It is an object of this invention to provide a pelleted sulfur product which is free of the foregoing disadvantages, and contains a very small proportion of non-sulfur ingredients, and which is highly resistant to attritional loss even with severe handling and after prolonged storage.

A further object is to provide a sulfur product which is plastic and otherwise adapted to be evenly worked into a mass of rubber as the latter is compounded and rolled. The nature of still other objects of the invention will be apparent from a consideration of the descriptive portion to follow.

The present invention is based on the discovery that the foregoing objects can readily be achieved by pelleting the powdered sulfur starting material with binder comprised of small but critical amounts of rubber latex, an oil, and a surface active agent acting to emulsify the oil and make the same compatible with the latex. On a dry weight basis, the pellets contain from about 1.1 to 1.25 parts of rubber latex, 0.25 to 1.5 parts oil, and a sufficient amount of the surface active agent to effect proper emulsification of the oil component, good results normally being had by using 0.025 to 0.25 part per 100 parts of sulfur.

The pellets are formed by combining the sulfur and binder ingredients with water to form a paste which is then extruded or otherwise formed into shapes of the desired size and configuration, and these shapes are then dried to provide the final pellet product. These pellets are especially well adapted to be incorporated in any of the usual rubber mixes wherein sulfur is a necessary component, though they are also employed with good results in preparing insecticide sprays, granular insecticides and fungicides, and the like.

Any desired, finely divided sulfur can be pelleted in the fashion described above. Thus, in the case of pellets which are to be incorporated in a mass of rubber to provide the sulfur ingredient thereof, use can be made of any of the rubber-maker's sulfur grades such, for example, as those commonly designated as tire brand, tube brand, flowers of sulfur, and insoluble sulfur; these latter two sulfurs are characterized in having a substantial sulfur content which is insoluble in carbon bisulfide. With pellets to be dissolved or dispersed in an appropriate vehicle for use in insecticidal spray applications or granular type insecticides or fungicides, other grades of sulfur can be employed, as required.

The rubber latex component of the pellet, as noted above, is employed in the proportion of at least 0.1 part and normally in a range of from 0.1 to 1.25 part per 100 parts by weight of sulfur. Use of a latex content below 0.1 part decreases the plasticity of the product and also results in a pelleted structure of unduly low stability. Thus, such pellets, for lack of required plasticity are not readily accepted by the nip of the rubber mill and tend to jump therefrom, whereas those prepared with 0.1 part or more of latex smear out and disperse readily in the rubber in the mill.

The unsatisfactory stability qualities which characterize pellets prepared with less than 0.1 part latex are further evidenced by a large increase in the fines produced as the pellets are handled, particularly after storage periods of one or more months. A preferred range for the latex component is from 0.25 to 1 part, while amounts larger than about 1.25 parts are not recommended since the expense of the binder is increased without offering any further benefits from the product quality standpoint. However, the use of amounts of latex larger than 1.25 parts is in no wise hampered as regards the quality of the pellets.

Rubber latices satisfactory for use in the present invention comprises those derived from either natural rubbers or the various types of synthetic rubbers such, for example, as acrylic rubbers, butadiene-acrylonitrile copolymers, butadiene-styrene rubbers, butadiene polymer, chloroprene rubbers, isobutylene rubbers, polyisobutylene-isoprene copolymers, silicone rubbers and polysulfide rubbers. Particularly good results have been obtained with rubber latices combining butadiene and styrene in the ratio of 70:30, respectively. These and other rubber latices are normally available in the form of fine dispersions in an aqueous vehicle, or are capable of being so dispersed preparatory to being combined with sulfur and the other binder ingredients to form the pellets hereof, typical dispersions containing approximately 23 to 62 percent rubber in the latex.

The oil ingredient of the binder is employed in an amount of at least 0.25 part and normally of from about 0.25 to 1.5 part, per 100 parts of sulfur. Pellets prepared with less than 0.25 part oil have little stability and are easily abraded and fractured. On the other hand, additions of oil beyond 1.25 parts do not alter the physical properties and serve only to increase the cost of the product. While satisfactory results can be obtained by using various oils, such as pine tar oil, cottonseed oil, synthetic plasticizers such as butyl oleate and dioctyl phthalate, oils of the so-called "process" variety (highly refined petroleum oils manufactured expressly for plasticizing various rubbers) are employed in the preferred practice of this invention. Representative "process" oils are Coprol Oil B (Atlantic Refining Company), Circo Light Processing Oil (Sun Oil Company, and Sovaloid N (Socony Mobil Oil Co.). Coprol Oil B has an A.P.I gravity at 60° F. of 23.5, and the S.S.U. viscosity is 105 at 100° F. and 39 at 210° F.

The surface-active agent employed is one which is capable of effectively emulsifying the oil and bringing about compatibility with the latex in the sulfur-paste mixture, the amount of emulsifyer employed for this purpose generally falling into a range of from about 0.025 to 0.25 part, per 100 parts of sulfur, or, expressed otherwise, per single part of oil. Representative emulsifying agents of the anionic type which may be successfully employed in a practice of this invention include various alkyl aryl sulfonates such as Nacconol NRSF (Allied Chemical and Dye corporation), Tamol N (Rohm and Haas Company), Nekal BX–78 (General Aniline and Film Corporation), petroleum sulfonates such as Petronate HL (L. Sonneborn Sons, Inc.), as well as fatty acid sulfates such as Duponol ME (du Pont Co.) and Orvus W A Paste (Proctor and Gamble Company). Also satisfactory are certain emulsifiers of the non-ionic type, e.g., Atlas 1256, a polyoxyethylene sorbitol ester of a higher fatty acid, as marketed by Atlas Powder Company, and Triton X–100, an alkyl aryl polyether alcohol, as marketed by Rohm and Haas Co.

mesh screen and sieved. Since all the pellets when first prepared were retained on the screen, the amount passing through after the tumbling treatment is an indication of the fines generated and hence of the stability of the pellets with relatively severe handling. The data presented in the following table shows the amounts of fines produced from these various pellet preparations.

*Storage stability test*

Sulfur 100 parts, emulsifier 0.1 part, plus indicated amounts of rubber and oil.

Percent fines produced at indicated storage condition.

| Oil Cont. | Rubr. Cont. | When Made | Room Temperature | | | 0° C. | | | 52° C. | | |
|---|---|---|---|---|---|---|---|---|---|---|---|
| | | | 1 Mo. | 2 Mo. | 3 Mo. | 1 Mo. | 2 Mo. | 3 Mo. | 1 Mo. | 3 Mo. | 3 Mo. |
| 1.00 | 1.00 | <0.25 | <0.25 | 0.25 | <0.25 | <0.25 | <0.25 | <0.25 | <0.25 | <0.25 | <0.25 |
| 1.00 | 0.50 | 0.50 | 0.25 | 0.25 | <0.25 | 0.25 | <0.25 | <0.25 | 0.50 | <0.25 | <0.25 |
| 1.00 | 0.25 | 1.00 | 1.25 | 1.00 | 2.00 | 1.50 | 1.00 | 1.00 | 1.75 | 1.00 | 0.50 |
| 1.00 | 0.10 | 3.75 | 5.50 | 6.00 | 5.00 | 5.00 | 5.50 | 4.50 | 4.75 | 5.00 | 5.00 |
| 1.00 | 0.00 | 17.50 | 13.50 | 40.00 | 32.50 | 9.00 | 47.50 | 40.00 | 11.75 | 10.00 | 10.00 |
| 0.00 | 0.50 | 66.00 | ---- | ---- | ---- | ---- | ---- | ---- | ---- | ---- | ---- |
| 0.00 | 1.00 | 45.00 | ---- | ---- | ---- | ---- | ---- | ---- | ---- | ---- | ---- |

Having selected the particular sulfur product and the additives to be employed, the recommended practice is to add sufficient water to the mixture of sulfur and additives to form a cohesive agglomerate, or heavy paste which can then be divided by a practice of conventional extrusion or screening methods into small pieces having the shape desired in the finished pellet. In general, the quantity of water required is of the order of 15–25 parts per 100 parts of sulfur. These wet, shaped elements are then dried at any appropriate temperature, good results having been obtained at temperature levels of 50°, 70° and 90° C. Experience has shown that at any given temperature, the drying time is the same regardless of the rubber latex content within limits of 0.1 to 1.0 part thereof. Further, for those samples of like rubber content, no difference in physical property or stability were noted with variation in drying temperature. In most instances the finished pellets were observed to have a residual water content of less than 0.05 percent.

The nature of the present invention will be more fully understood by reference to the data presented in the following example which is set forth by way of illustration.

EXAMPLE

In this operation pastes were prepared containing water (25 parts), rubber-maker's sulfur (100 parts), emulsifier (Atlas 1256) 0.1 part, oil (Coprol Oil B) 1.0 part, and rubber latex (either Pliolite Latex 2105 or Polyco 397–70 NS, both 70:30 butadiene-styrene rubbers) in varying proportions, i.e., 0.1, 0.25, 0.5 and 1.0, respectively. These parts by weight of the latex are on a dry weight basis and do not take into account the amount of water (about 60 percent) and other non-rubber materials present in the commercial product. As a control, certain batches were also prepared in which the rubber latex ingredient was omitted.

The various paste compositions prepared were forced through an 8-mesh screen, the extrudate being cut from the screen and allowed to drop in a pan. The pan was then oscillated in a circular motion, and within several moments spherical or oval pellets apupproximately ⅛" diameter were formed. These wet pellets were then dried at a temperature of 90° C.

To evaluate the stability of the resulting dried pellets, a portion was tested in its freshly prepared condition, while others were stored for a period of from one to three months, some at room temperature, others at 0° C., and others at approximately 50° C. At the end of the storage period, 20 grams of the pellets from the portion under test was placed in a 4-ounce jar and the jar was tumbled end over end for 15 minutes at 96 r.p.m. After tumbling, the contents of the jar were transferred to a 40-

From the foregoing table it will be seen that amounts of rubber as small as 0.1 part impart stability characteristics to the pellets far superior to those observed in the absence of any rubber component. However, appreciably better results are obtained at the 0.25–1 part rubber level. Further, it can be seen that the combination of rubber latex and oil gives a product of high order stability; contrast this with the products obtained with either rubber latex or oil alone.

The amount of fines produced from pellets dried at 50° C. and 70° C. was substantially the same as from pellets dried at 90° C.

All the rubber containing pellets made in the foregoing example were found to be capable of smearing out and dispersing readily in a rubber mixture as the same was being milled. Further, it was observed that the dispersion of sulfur in the resulting rubber product was better than that which could otherwise be obtained by using just the powdered sulfur from which the pellets were made.

As employed herein and in the claims, the terms "rubber" and "rubber latex" are employed somewhat interchangeably, reference being had, in any event, to a product formed by the addition of a rubber latex material, as described above.

We claim:

1. A pelleted sulfur product comprising predominantly sulfur and containing from about 0.1 to 1.25 parts rubber per 100 parts sulfur, said rubber being selected from the group consisting of natural rubber, butadiene-acrylonitrile copolymers, butadiene-styrene rubbers, rubbery chloroprene polymers and isobutylene-isoprene co-polymers and mixtures thereof, from 0.025 to 0.25 part of a surface active agent selected from the group consisting of anionic and non-ionic surface active agents per 100 parts sulfur and at least 0.25 part hydrocarbon oil per 100 parts sulfur, all parts being by weight.

2. A pelleted sulfur product containing from about 0.1 to 1.25 parts of rubber per 100 parts sulfur, said rubber being selected from the group consisting of natural rubber, butadiene-acrylonitrile co-polymers, butadiene-styrene rubbers, rubbery chloroprene polymers and isobutylene-isoprene co-polymers, and mixtures thereof and from 0.025 to 0.25 part of a surface active agent selected from the group consisting of anionic and non-ionic surface active agents per 100 parts of sulfur and 0.25 to 1.5 parts of a hydrocarbon oil per 100 parts of sulfur, all parts being by weight.

3. The product of claim 2 wherein the rubber content is from 0.25 to 1 part per 100 parts sulfur.

4. The product of claim 2 wherein the rubber is a synthetic butadiene-styrene product present in an amount of from 0.25 to 1 part per 100 parts sulfur.

5. The product of claim 2 wherein the hydrocarbon oil is a mineral oil.

6. A process for the production of sulfur in the form of pellets having good plasticity and stability characteristics, which comprises admixing 100 parts of powdered sulfur, 0.1 to 1.25 parts rubber latex, said latex being selected from the group consisting of natural rubber, butadiene-acrylonitrile co-polymers, butadiene-styrene rubbers, rubbery chloroprene polymers and isobutylene-isoprene co-polymers, and mixtures thereof, 0.25 to 1.5 parts hydrocarbon oil and a sufficient amount of a surface active agent selected from the group consisting of anionic and non-ionic surface active agents to emulsify the oil and with water in amount necessary to form a paste; forming said paste into the desired pellet shapes and drying said shapes, all parts being by weight.

7. The process of claim 6 wherein the oil is a "process" oil.

8. The process of claim 6 wherein the rubber latex is one of a butadiene-styrene synthetic rubber.

References Cited in the file of this patent

UNITED STATES PATENTS

| | | |
|---|---|---|
| 1,871,038 | Cadwell | Aug. 9, 1932 |
| 2,069,710 | Missbach | Feb. 2, 1937 |
| 2,640,088 | Glenn et al. | May 26, 1953 |

OTHER REFERENCES

Hancock: Industrial & Eng. Chem., November 1954, vol. 46, No. 11, pp. 2431–2434.